(12) United States Patent
Krauss

(10) Patent No.: US 10,623,487 B2
(45) Date of Patent: Apr. 14, 2020

(54) MOVEABLE DISTRIBUTED SYNCHRONIZATION OBJECTS

(71) Applicant: International Business Machines Corporation, Armonk, NY (US)

(72) Inventor: Kirk J. Krauss, San Jose, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 263 days.

(21) Appl. No.: 15/403,312

(22) Filed: Jan. 11, 2017

(65) Prior Publication Data

US 2018/0198731 A1 Jul. 12, 2018

(51) Int. Cl.
*H04L 29/08* (2006.01)

(52) U.S. Cl.
CPC .............................. *H04L 67/1095* (2013.01)

(58) Field of Classification Search
CPC .......................... H04L 47/783; H04L 67/1095
See application file for complete search history.

(56) References Cited

U.S. PATENT DOCUMENTS

| | | | |
|---|---|---|---|
| 8,195,608 B2 | 6/2012 | Arcese et al. | |
| 8,224,977 B2 | 7/2012 | Loaiza et al. | |
| 9,471,400 B1* | 10/2016 | Greco | G06F 9/528 |
| 10,212,099 B2* | 2/2019 | Krishnamurthy | G06F 9/5088 |
| 2004/0220933 A1* | 11/2004 | Walker | G06F 9/466 |
| 2006/0143178 A1* | 6/2006 | Chan | G06F 17/30362 |
| 2006/0248127 A1* | 11/2006 | Whitehouse | G06F 9/526 |
| 2007/0124728 A1* | 5/2007 | Rosenbluth | G06F 9/526 718/100 |
| 2008/0059471 A1* | 3/2008 | Loaiza | G06F 9/526 |
| 2009/0300071 A1* | 12/2009 | Arcese | G06F 17/30174 |
| 2011/0161540 A1* | 6/2011 | Chang | G06F 9/526 710/200 |
| 2014/0365549 A1* | 12/2014 | Jenkins | G06F 9/526 709/201 |

(Continued)

FOREIGN PATENT DOCUMENTS

| | | |
|---|---|---|
| CN | 103297456 | 9/2013 |
| CN | 104239418 | 12/2014 |
| CN | 105354263 | 2/2016 |

OTHER PUBLICATIONS

Mel, et al. "The NIST Definition of Cloud Computing". Recommendations of the National Institute of Standards and Technology. Nov. 16, 2015.

(Continued)

*Primary Examiner* — Chris Parry
*Assistant Examiner* — Steven C Nguyen
(74) *Attorney, Agent, or Firm* — Samuel Waldbaum, Esq.; McGinn IP Law Group, PLLC

(57) ABSTRACT

A resource sharing method, system, and computer program product in a distributed computing environment, includes in response to a first condition, determining a first node on which an access rate of a synchronization object is greatest, storing the synchronization object on the first node for use in synchronizing access to a resource, and in response to a second condition, determining a second node on which an access rate of the synchronization object is greatest, and relocating the synchronization object from a storage on the first node to a storage on the second node.

15 Claims, 10 Drawing Sheets

(56) References Cited

U.S. PATENT DOCUMENTS

2015/0350318 A1* 12/2015 Van Assche ........ H04L 67/1095
709/202
2016/0055170 A1* 2/2016 Gower ................ G06F 16/1774
707/622
2016/0092463 A1 3/2016 Vijayan

OTHER PUBLICATIONS

Disclosed anonymously. (2011). A Mechanism & Apparatus for Multi-tenant Synchronization. *IPCOM000206373D*.

McCloskey, B., Zhou, F., Gay, D. et al. (2006). Autolocker: synchronization inference for atomic sections. *ACM SIGPLAN Notices*, 41(1), 346-358.

\* cited by examiner

Synchronization Object Acquisition (Local Node)

Synchronization Object Acquisition (Remote Node)

MOVEABLE DISTRIBUTED SYNCHRONIZATION OBJECTS

BACKGROUND

The present invention relates generally to a resource sharing method applicable to a cloud computing environment, and more particularly, but not by way of limitation, to a system, method, and computer program product for optimizing access to synchronization objects, also known as locks, by placing them at the nodes that need them the most, prospectively moving them from node to node as the access pattern changes at runtime.

A common difficulty for cloud computing environments and other distributed systems is that of arranging safe access to resources shared by multiple nodes. Strategies used for synchronized resource sharing in these systems include avoidance, synchronized clocks, election of a coordinator component or node to manage resources, a token ring strategy (e.g., round-robin, etc.) where one node at a time may acquire a lock, etc.

However, none of these strategies allows a worker node to ordinarily attempt to acquire a lock immediately on demand. If a lock will be acquired at all, there is nearly always a delay, either for a timestamp check that must coordinate access, or for a resource manager that must intervene, or for a token that goes around and must come around. For that reason, resource sharing is, at best, quite a bottleneck. At worst, it is arguably the biggest design constraint in modern computing.

SUMMARY

In an exemplary embodiment, the present invention can provide a computer-implemented resource sharing method in a distributed computing environment, the method including in response to a first condition, determining a first node on which an access rate of a synchronization object is greatest, storing the synchronization object on the first node for use in synchronizing access to a resource, and in response to a second condition, determining a second node on which an access rate of the synchronization object is greatest, and relocating the synchronization object from a storage on the first node to a storage on the second node. One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways that should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
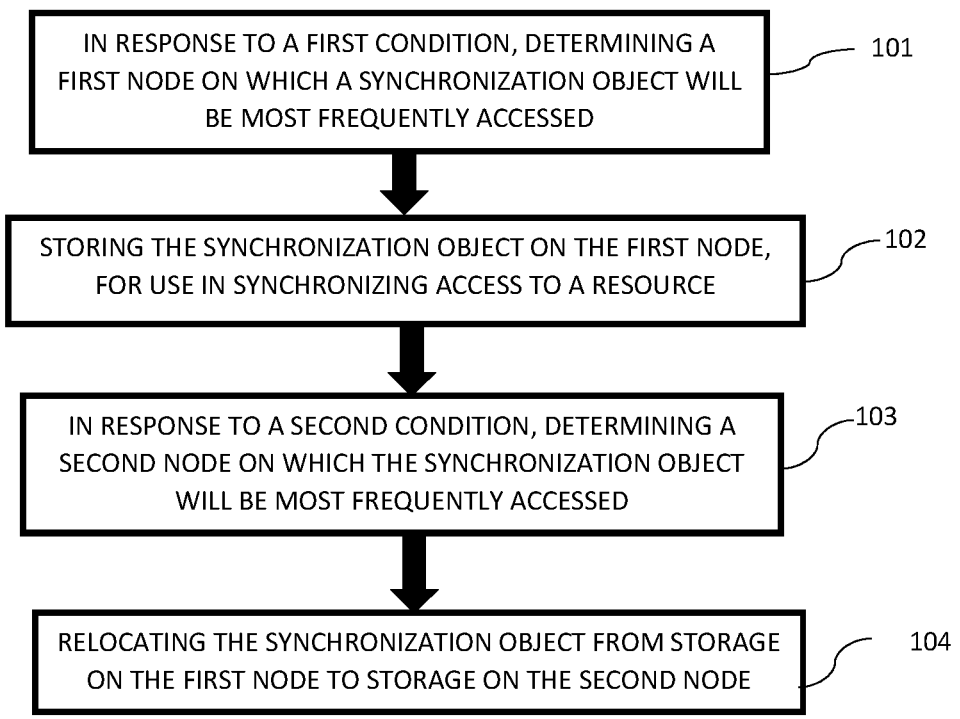
FIG. 1 exemplarily shows a high-level flow chart for a resource sharing method 100 according to an embodiment of the present invention.

The invention will now be described with reference to FIGS. 1-10, in which like reference numerals refer to like parts throughout. It is emphasized that, according to common practice, the various features of the drawings are not necessarily to scale. On the contrary, the dimensions of the various features can be arbitrarily expanded or reduced for clarity.

By way of introduction of the example depicted in FIG. 1, an embodiment of a resource sharing method 100 according to the present invention can include various steps for acquiring or releasing a lock and entails having current information about the node on which it resides. By way of introduction of the example depicted in FIG. 8, one or more computers of a computer system 12 according to an embodiment of the present invention can include a memory 28 having instructions stored in a storage system to perform the steps of FIG. 1.

Referring now generally to the embodiments of FIGS. 1-7 and the pseudo (sample) code in the attached Appendix, acquiring or releasing a lock entails having current information about the node on which it resides. This is simplest when the lock resides on the node that is acquiring or releasing it and the node can store information about its own locks. When a lock is stored on a node where a lock acquisition or release routine is executing, that routine can verify that the lock is locally stored, for example by looking to node identification information associated with the lock. The routine can immediately locate, and attempt to acquire or release, a locally-resident lock.

For that reason, and to speed lock usage generally, a node that can be expected to frequently acquire and release a lock can be the node on which the lock resides. This ensures that the node which most needs the lock, gets the lock, with no delays (unless the lock is already held). Often, the resource protected by the lock will reside on that same node. The term "reside" as used herein indicates memory or other storage built into, attached to, or most readily accessible by, a node. If a lock and a resource reside on the same node, then either or both of the lock and the resource are entirely memory-resident on that node, partially resident in memory and partially resident in one or more other forms of storage such as disk-based storage most readily accessible by that node, or entirely resident in such other forms of storage most readily accessible by that node.

A node also can cache information about the locks residing on other nodes, but doing so entails keeping the cache up-to-date on each node. A shared pool structure can help with the needed lock tracking. For systems with relatively large numbers of locks, when a cache lookup fails to retrieve a current reference to a given lock, the lock can be found via a node identifier (i.e., a "forwarding address") left behind at its last known location. That is, when a lock is relocated, its old location can refer to its new location. Alternatively, the lock's location can be tracked by a pool manager node that can then always serve, even as a last resort, to find the lock if it is not local and if the cache is not current (e.g., see pseudo code in the Appendix).

The cached information at a node can be updated whenever a forward reference to a lock is resolved. When this has been resolved for every node (i.e., when all the caches have been updated with respect to a lock that has moved between nodes) any remaining reference information for that lock at its old location can be deleted. In a pool manager embodiment, this checking and deleting step may not be necessary.

If pooled locks are used, a specific node can serve as a pool manager, which arranges the relocation of locks between nodes and thus tracks which node contains which lock. Small objects can be associated with individual locks (e.g., one lock, from the pool, per instance). Entire objects, together with the locks that protect them, can be moved from node to node and tracked by the pool manager or by a more elaborate memory manager which may know where both the object and its lock reside.

For systems requiring only relatively small numbers of locks, the nodes can share a common address space describing which lock resides on which node. Ordinary shared memory could serve this purpose, and any pooling and/or caching protocols, such as what is described above, would not be necessary.

In some situations, a lock may be relocated from one node to another based on an analysis or other steps performed prior to or during a run of a distributed executable module. Lock relocation might happen, for example, in response to entry into a routine known to make more accesses to resources protected by the lock than any other routine. Speculative or profile-guided analysis can determine when to relocate a lock.

In profile-guided embodiments, a profiler for determining lock usage can be run in advance of live deployment. Profiling data can be stored per routine. Upon entering a routine that (together with its subroutines) makes the most frequent acquisitions and releases of a lock, if the lock is not resident at the current node, it can be relocated. Other, alternative conditions that might trigger a lock relocation can include the loading of a module that contains such a routine, or a call into a function exported from such a module and found by advance analysis to typically enter such a routine.

In some embodiments, a lock can be relocated while it is held. The relocation while being held can be possible if the lock release functionality does not assume, at lock release time, that the lock will still be resident on the same node on which it was acquired.

In other embodiments, a lock may not be moved so long as it is being used to protect a resource (i.e., the relocation would instead have to wait until the lock is free). In that case, the lock itself would need to be protected from any routine acquiring it again until it has been relocated. This could be done by "faking" an acquisition (i.e., making the lock appear to be held while it is being relocated).

Because locks are typically small, and in some embodiments may rely on profile-guided lock placement, the lock placement can be optimized so that in most situations, an attempt to acquire a lock in the distributed environment has no delays. It may even be possible to not copy any data in order to relocate a lock. Rather, the reference to a lock on one node can be invalidated in favor of a "copy" of the same lock on another node. In other words, the locks would be redundant, with a copy per relevant node, but of course only one copy could be active at a time. This would enable rapid relocation of locks between nodes, for optimized access to locks at all times.

Referring now to FIG. 1 and the Appendix, in step 101, in response to a first condition, a first node is determined on which an access rate of a synchronization object is greatest. It is noted that the determining can include a "prediction" of the first mode and the first mode can be predicted incorrectly (i.e., an attempt to make this determination, e.g. a predictive effort, would trigger step 101). The first condition can include one or more of, but is not limited to, launching or beginning a run of an executable module or process, the allocation or initialization of the synchronization object at the first node, the allocation, initialization, or placement of a shared resource at the first node, the entry of a routine, or the loading of a software component or module. Determination that the access rate of the synchronization object is greatest on the first node can be based on any aspect of the first condition. In some embodiments, the determination can be a predictive determination. The predictive determination can be based on profile-guided lock placement, speculative code analysis or execution, heuristics, machine learning, or other advance analysis or live/runtime analysis. The predictive determination also can be merely a determination based on the placement of objects at nodes as aspects of the first condition. In step 102, the synchronization object on the first node is stored for use in synchronizing access to a resource. In step 103, in response to a second condition, a second node is determined on which an access rate of the synchronization object is greatest. The second condition can include one or more of, but is not limited to, the placement of a shared resource at the second node, the relocation of a shared resource from the first node to the second node, the entry of a routine, or the loading of a software component or module. Determination that the access rate of the synchronization object is greatest on the second node can be based on any aspect of the second condition or can be a predictive determination. The predictive determination can be based on profile-guided lock placement, speculative code analysis or execution, heuristics, machine learning, or other advance analysis or live/runtime analysis. The predictive determination also can be merely a determination based on the placement of objects at nodes as aspects of the second condition. Finally, in step 104, the synchronization object is relocated from a storage on the first node to a storage on the second node.

Figure 2:
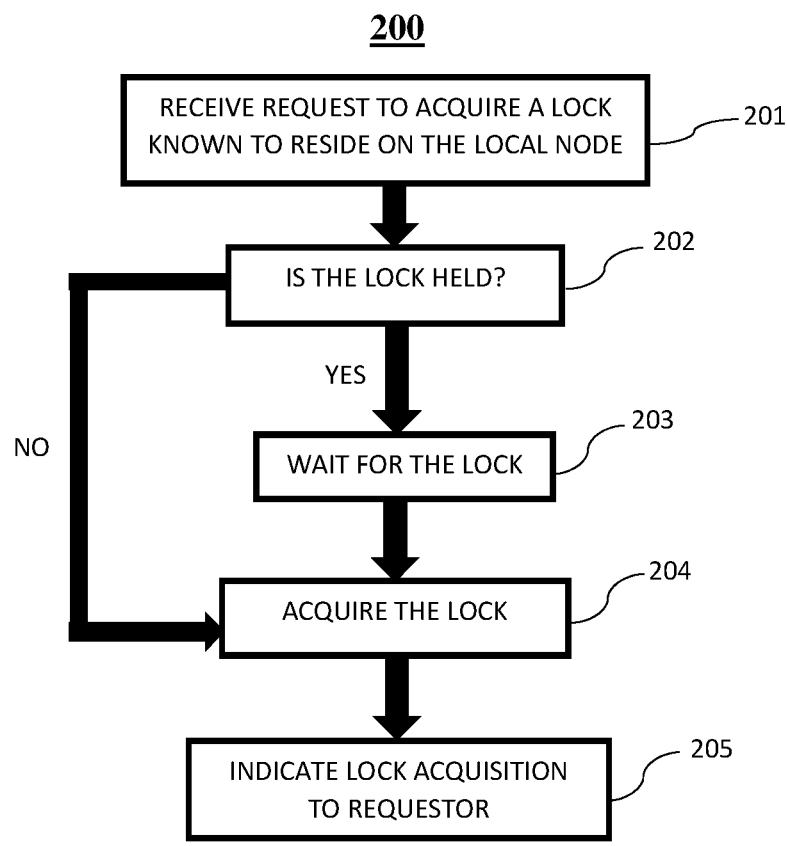
FIG. 2 exemplarily shows a high-level flow chart for a method 200 for synchronization object acquisition at a local node according to an embodiment of the present invention.
Figure 3:
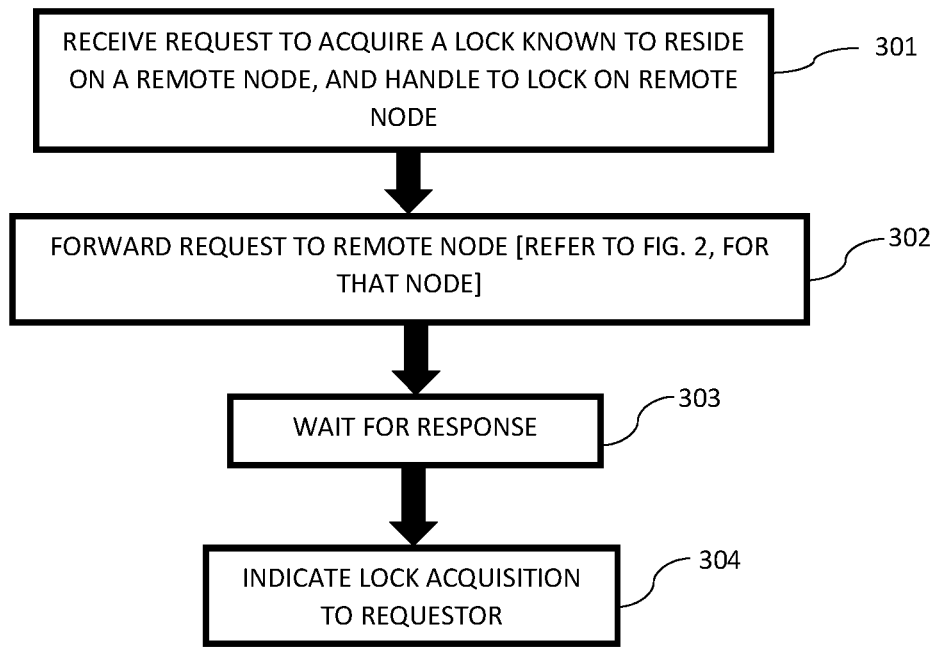
FIG. 3 exemplarily shows a high-level flow chart for a method 300 for synchronization object acquisition at a remote node according to an embodiment of the present invention.
Figure 4:
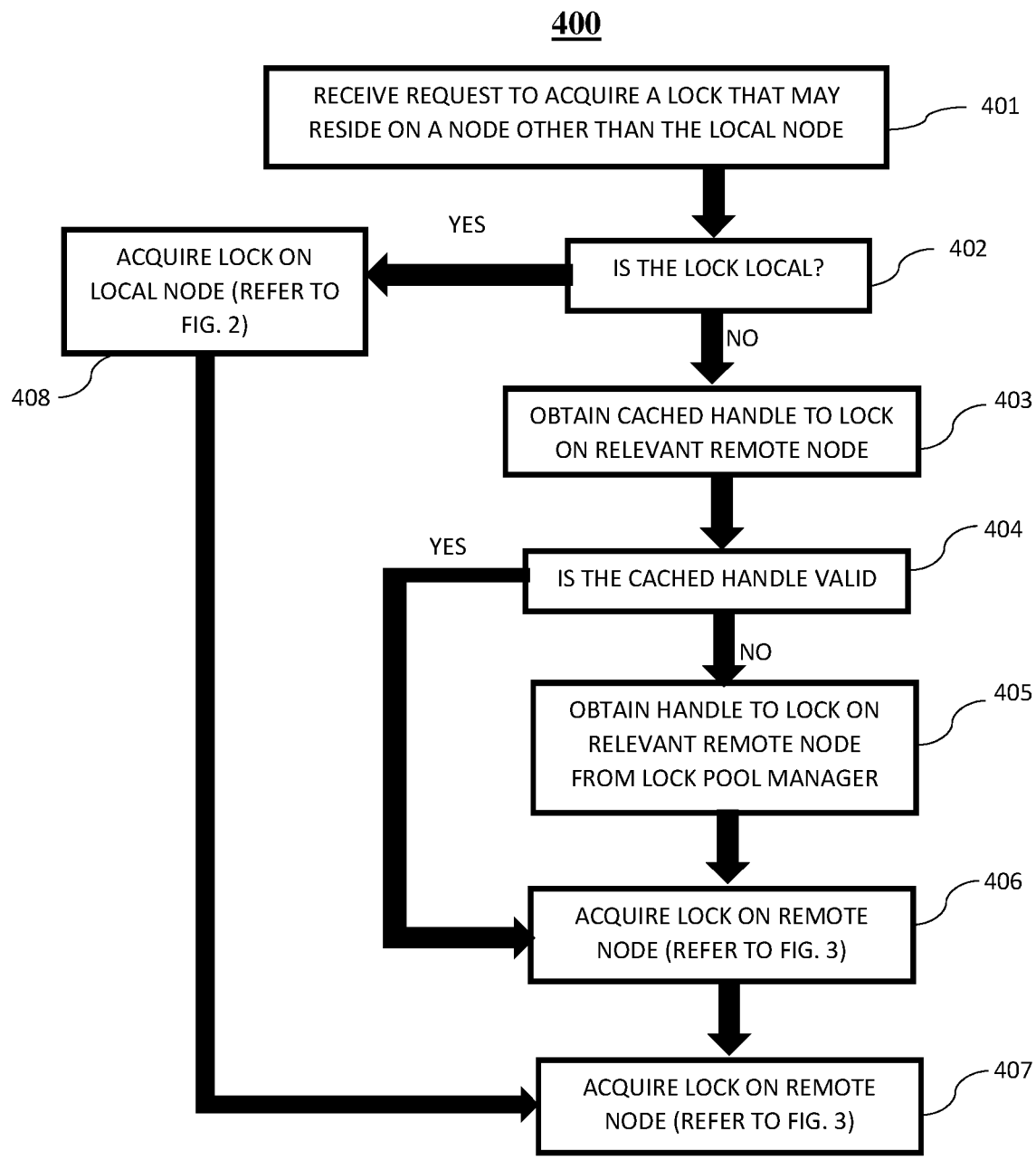
FIG. 4 exemplarily shows a high-level flow chart for a method 400 for synchronization object acquisition at a local or remote node according to an embodiment of the present invention.

In another embodiment as depicted in FIGS. 2-4 and as described in the Appendix, in step 201 of the synchronization object acquisition at a local node flow 200, a request to acquire a lock known to reside on a local node is received. In step 202, if the lock is held, execution waits the lock to be released in step 203 before acquiring it in step 204. If the lock is not held in step 202, the lock is acquired in step 204. Then, in step 205, the lock acquisition is indicated to the requestor. As depicted in FIG. 3, step 301 of the synchronization object acquisition at a remote node flow 300, a request is received to acquire a lock known to reside on a remote node, along with a handle to the lock on the remote node. In step 302, the request is forwarded to the remote node (e.g., refer to FIG. 2 for steps that can be taken to determine the node). In step 303, execution waits for the response and then the lock acquisition is indicated in step 304 to the requestor. Referring now to FIG. 4, in step 401 of the synchronization object acquisition (local or remote) flow 400, a request is received to acquire a lock that may reside on a node other than the local node. In step 402, a determination is made as to whether the lock is local. If the lock is not local (NO), the cached handle to the lock on the relevant remote node is obtained in step 403. The lock on the remote node is acquired (refer to FIG. 3) in step 407. If the lock is local (YES), the lock is acquired via the local handle (e.g., as shown in FIG. 2) in step 408. In step 404, the validity of the cached handle obtained in step 403 is determined. If the cached handle is valid (YES), the lock on the remote node is acquired in step 406 (refer to FIG. 3). If the cached handle is not valid (NO), then the handle to the lock on the relevant remote node is obtained from the lock pool manager in step 405 before execution proceeds to steps 406 and 407.

Those skilled in the art will appreciate the advantages of the caching aspects described with respect to the synchronization object acquisition (local or remote) flow 400 and related charts. A first advantage is that the caching of a remote lock can make the acquisition or usage of the remote lock appear to local code like any other lock acquisition or usage process. The use of a cached handle to a remote lock to access the actual lock state on the remote node need not be known to the caller of a lock acquisition routine that relies on such a flow. This serves to hide the relocatable lock implementation from any caller routines developed without the expectation that locks are relocatable, so that lock relocation happens transparently with no extra implementation on the part of developers, as befits a well-organized software module, runtime library, or the like. A second advantage is that the caching of remote locks makes the use of a lock pool faster than it would have been, had the lock pool manager been consulted for each and every remote lock acquisition. The pool manager may reside on a node different from both the local node on which the cached lock resides, and the remote node on which the actual lock resides. The ability to skip the consultation of a lock manager for a typical acquisition of a remote lock can result in an embodiment whose performance is at least equal to that of any other means of execution-context-safe access to a remote resource. Further, the placement of the lock at a node that most frequently uses it, in accordance with the invention, minimizes remote lock access. The caching shown in FIG. 4 can ensure that there is no case in which an embodiment is outperformed by prior art distributed lock arrangements, while the optimization of lock placement made possible by the invention can ensure that in most cases, an embodiment will substantially outperform the prior art.

Figure 5:
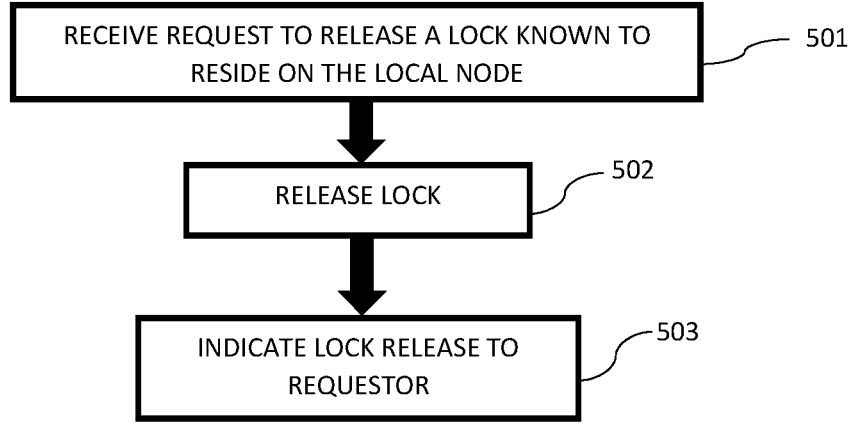
FIG. 5 exemplarily shows a high-level flow chart for a method 500 for synchronization object acquisition at a local node according to an embodiment of the present invention.
Figure 6:
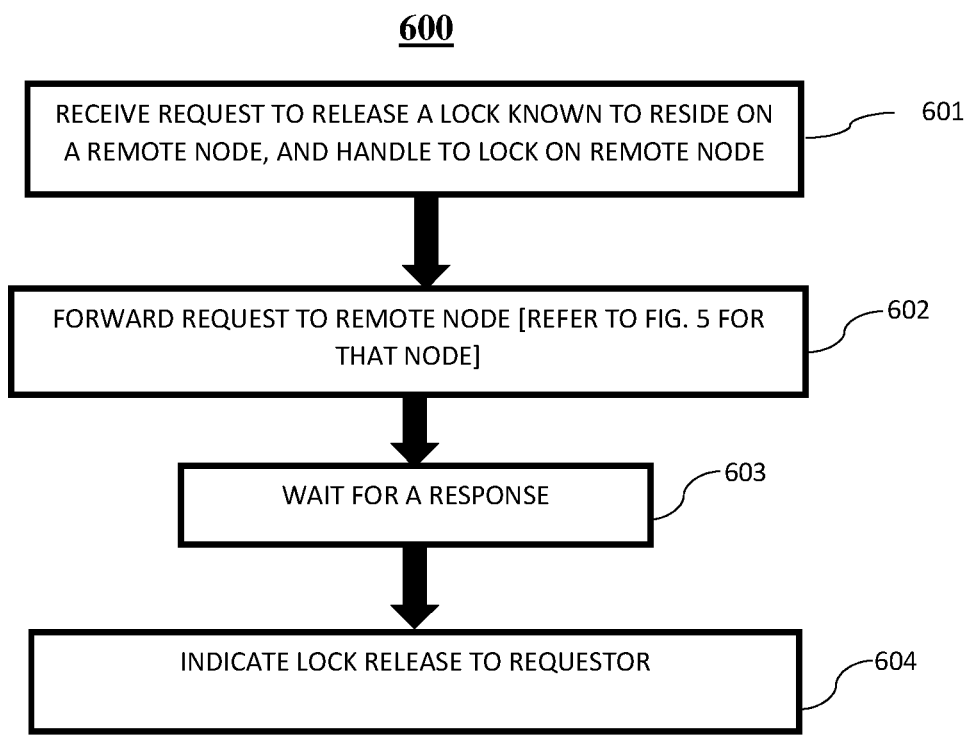
FIG. 6 exemplarily shows a high-level flow chart for a method 600 for synchronization object acquisition at a remote node according to an embodiment of the present invention.
Figure 7:
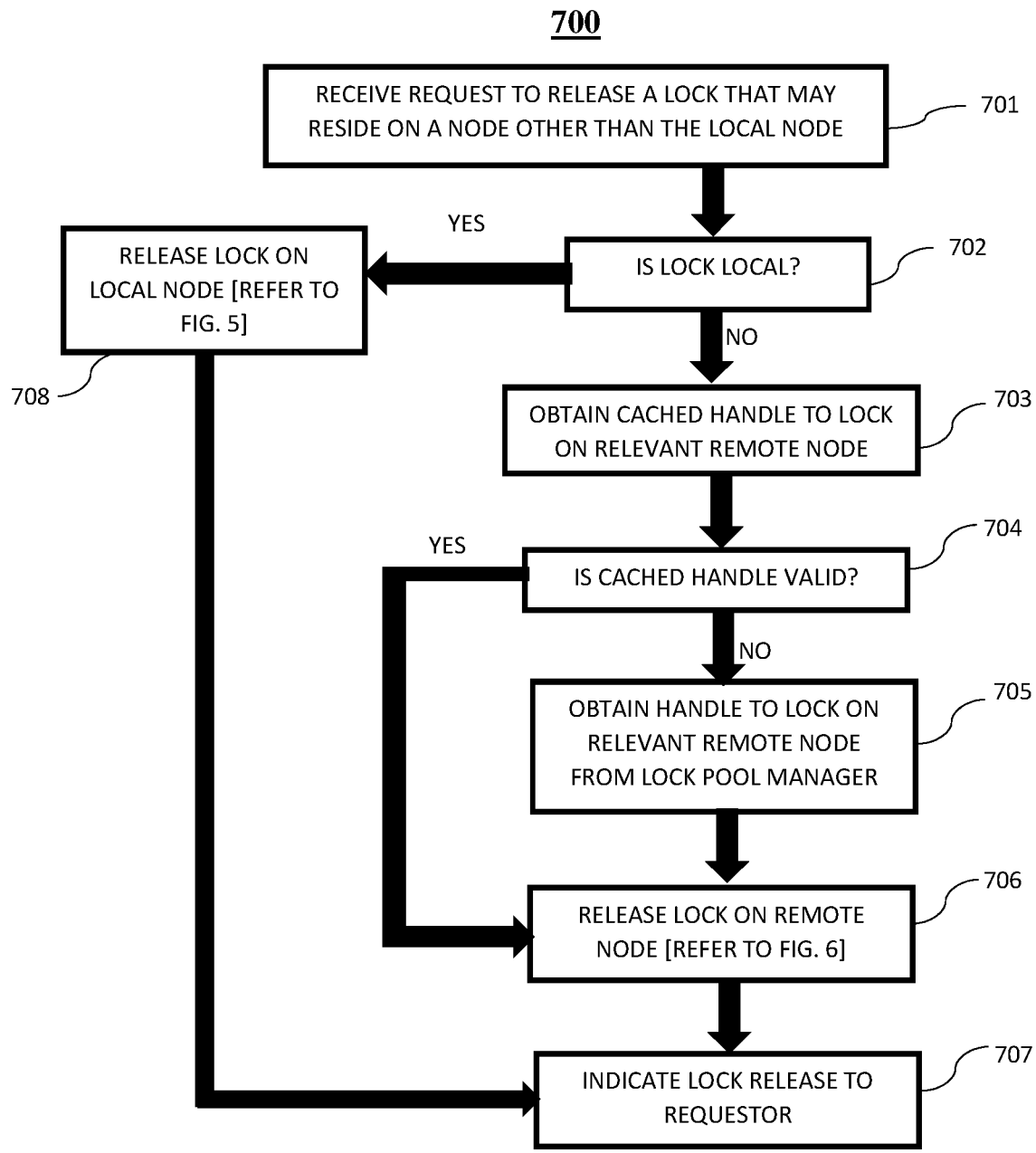
FIG. 7 exemplarily shows a high-level flow chart for a method 700 for synchronization object acquisition at a local or remote node according to an embodiment of the present invention.

In another embodiment as depicted in FIGS. 5-7 and as described in the Appendix, in step 501 of the synchronization object release at a local node flow 500, a request to release a lock known to reside on a local node is received. In step 502, the lock is released. Then, in step 503, the lock release is indicated to the requestor. As depicted in FIG. 6, step 601 of the synchronization object release at a remote node flow 600, a request is received to release a lock known to reside on a remote node, along with a handle to the lock on the remote node. In step 602, the request is forwarded to the remote node (e.g., refer to FIG. 5 to determine the node). In step 603, execution waits for the response and then the lock release is indicated in step 604 to the requestor. Referring now to FIG. 7, in step 701 of the synchronization object release (local or remote) flow 700, a request is received to release a lock that may reside on a node other than the local node. In step 702, it is determined if the lock is local and if the lock is not local (NO), the cached handle to the lock on the relevant remote node is obtained in step 703 and the lock on the remote node is released to the requestor in step 707. If the lock is local (YES), the lock is released via the local handle (e.g., in FIG. 5) in step 708. In step 704, the cached handle obtained in step 703 is validated. If valid (YES), the lock on the remote node is released in step 706 (refer to FIG. 6). If not valid (NO), then the handle to the lock on the relevant remote node is obtained from the lock pool manager in step 705 before execution proceeds to steps 706 and 707.

It is noted that the pseudo code provided in the Appendix generally describes the process flow of FIGS. 1-7 but the invention is not limited to the pseudo code as provided in the Appendix.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of distributed computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
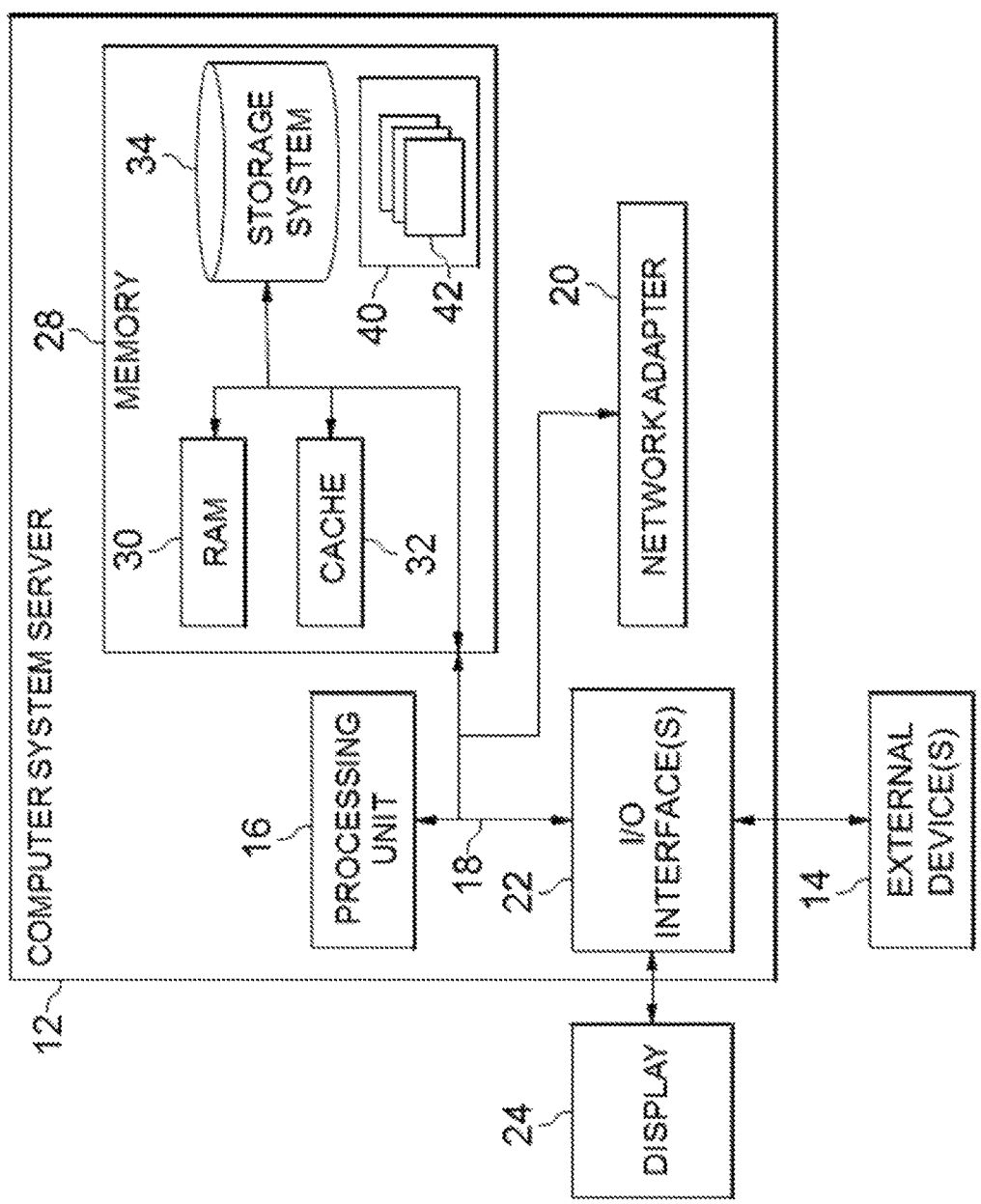
FIG. 8 depicts a cloud-computing node 10 according to an embodiment of the present invention.

Referring now to FIG. 8, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 8, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or more program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 9:
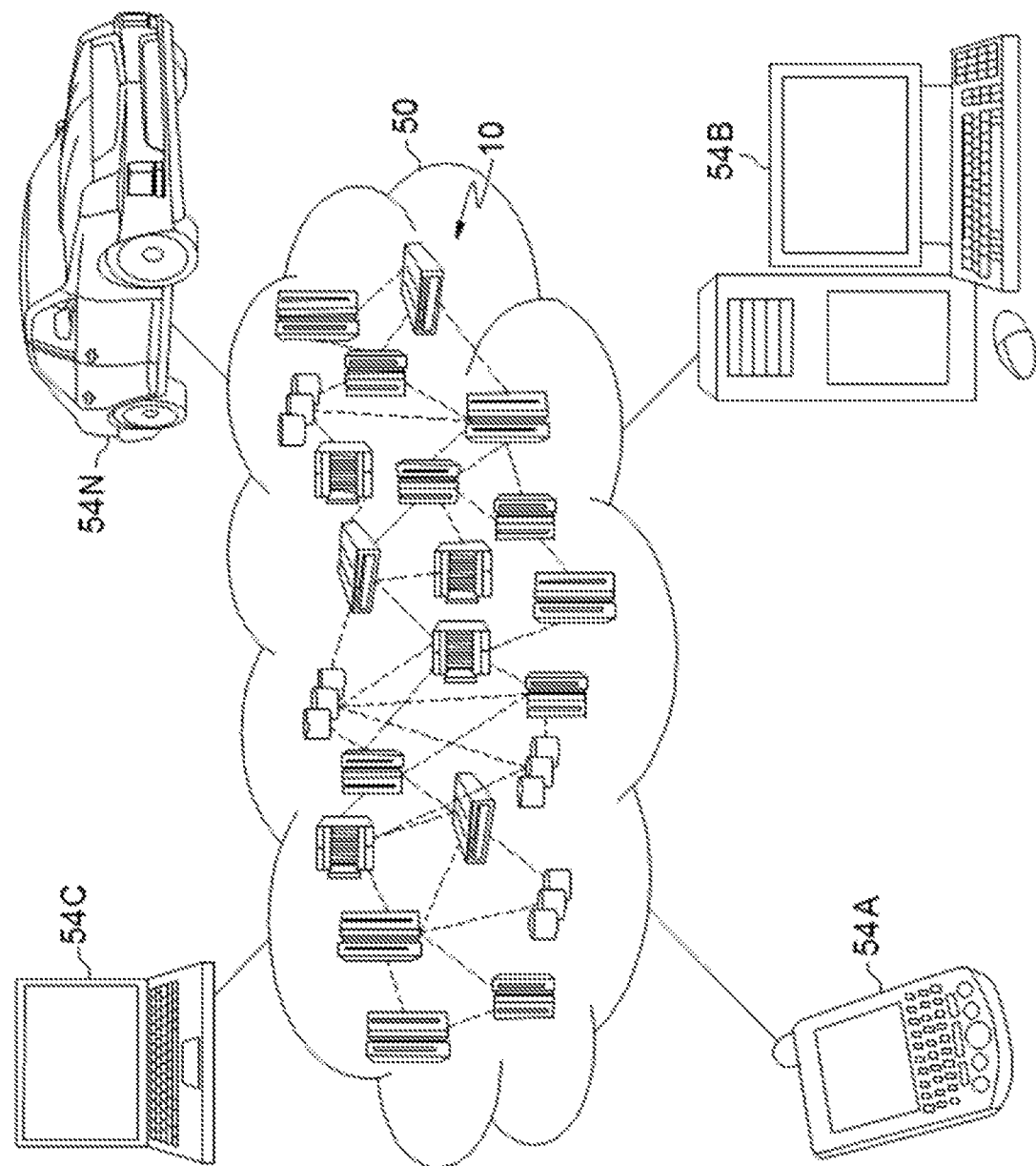
FIG. 9 depicts a cloud-computing environment 50 according to an embodiment of the present invention.

Referring now to FIG. 9, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 9 are intended to be illustrative only and that computing nodes 10 and cloud computing environment 50 can communicate with any type of computerized circuit over any type of network and/or network addressable connection (e.g., using a web browser).

Figure 10:
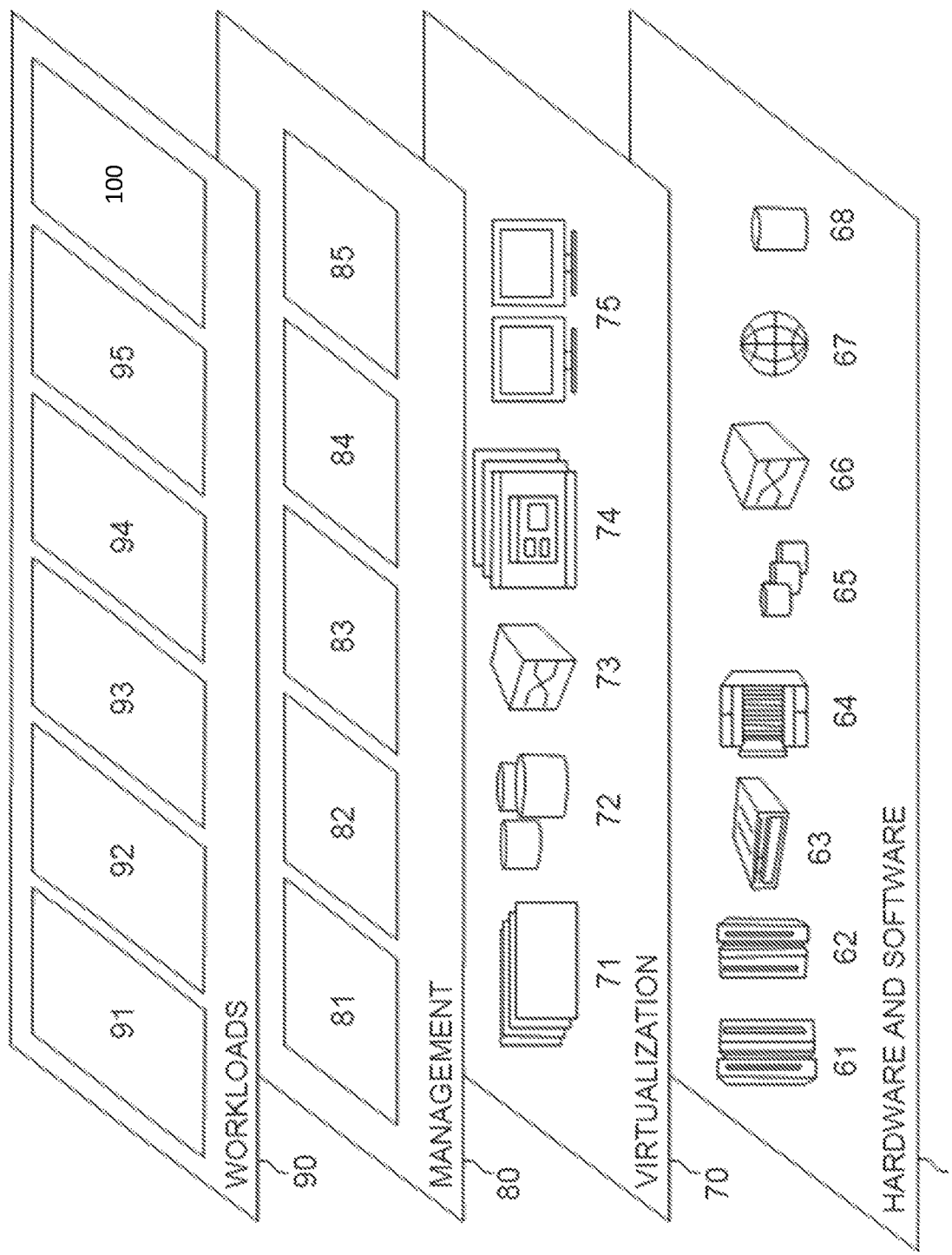
FIG. 10 depicts abstraction model layers according to an embodiment of the present invention.

Referring now to FIG. 10, an exemplary set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and resource sharing method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), a Storage Area Network (SAN), a Network Attached Storage (NAS) device, a Redundant Array of Independent Discs (RAID), an erasable programmable read-only memory (EPROM or Flash memory), a static random access memory (SRAM), a portable compact disc read-only memory (CD-ROM), a digital versatile disk (DVD), a memory stick, a USB "thumb" drive, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented resource sharing method in a distributed computing environment, the method comprising:
   in response to a first condition, determining a first node in the distributed computing environment on which an access rate of a synchronization object is greatest;
   storing the synchronization object on the first node, for use in synchronizing access to a resource;
   in response to a second condition, determining a second node in the distributed computing environment on which an access rate of the synchronization object is greatest; and relocating, as a lock move, the synchronization object from a storage on the first node to a storage on the second node, wherein a profile based lock placement and the lock move is used on the first node and the second node, wherein the profile includes the lock placement and the lock move and usage of the lock in a pool that extends across all nodes in the distributed computing environment, wherein the lock move is not moved when the synchronization object is being used to protect the resource, wherein the node on which the access rate of the synchronization object is greatest is determined by an analysis of profiling results, and wherein the node on which the access rate of the synchronization object is greatest is determined by a speculative code analysis or execution.

2. The computer-implemented method of claim 1, wherein the first condition comprises a beginning of a run and a second condition comprises an entry of a routine, and wherein the second condition comprises a relocation of a resource as the lock move from the first node to the second node.

3. The computer-implemented method of claim 2, wherein the routine is resident on the second node and the relocating of the synchronization object from the first node to the second node is performed in response to entering the routine.

4. The computer-implemented method of claim 1, wherein the relocating the synchronization object from the storage on the first node to the storage on the second node comprises invalidating an instance of the synchronization object on the first node and validating a pre-existing instance of the synchronization object on the second node.

5. The computer-implemented method of claim 1, wherein a status of the lock placement is cached by each node in the distributed computing environment on which the lock is not resident.

6. The computer-implemented method of claim 1, wherein the lock protects the resource by serializing access to the resource.

7. A computer program product for resource sharing, the computer program product comprising a computer-readable storage medium having program instructions embodied therewith, the program instructions executable by a computer to cause the computer to perform:

in response to a first condition, determining a first node in the distributed computing environment on which an access rate of a synchronization object is greatest;

storing the synchronization object on the first node, for use in synchronizing access to a resource;

in response to a second condition, determining a second node in the distributed computing environment on which an access rate of the synchronization object is greatest; and relocating, as a lock move, the synchronization object from a storage on the first node to a storage on the second node, wherein a profile based lock placement and the lock move is used on the first node and the second node, wherein the profile includes the lock placement and the lock move and usage of the lock in a pool that extends across all nodes in the distributed computing environment, wherein the lock move is not moved when the synchronization object is being used to protect the resource, wherein the node on which the access rate of synchronization object is greatest is determined by an analysis of profiling results, and wherein the node on which the access rate of the synchronization object is greatest is determined by a speculative code analysis or execution.

8. The computer program product of claim 7, wherein the first condition comprises a beginning of a run and a second condition comprises an entry of a routine.

9. The computer program product of claim 8, wherein the routine is resident on the second node and the relocating of the synchronization object from the first node to the second node is performed in response to entering the routine.

10. The computer program product of claim 7, wherein the relocating the synchronization object from the storage on the first node to the storage on the second node comprises invalidating an instance of the synchronization object on the first node and validating a pre-existing instance of the synchronization object on the second node.

11. A resource sharing system, said system comprising:
a processor; and
a memory, the memory storing instructions to cause the processor to perform:
in response to a first condition, determining a first node in the distributed computing environment on which an access rate of a synchronization object is greatest;
storing the synchronization object on the first node, for use in synchronizing access to a resource;
in response to a second condition, determining a second node in the distributed computing environment on which an access rate of the synchronization object is greatest; and
relocating, as a lock move, the synchronization object from a storage on the first node to a storage on the second node,
wherein a profile based lock placement and the lock move is used on the first node and the second node,
wherein the profile includes the lock placement and the lock move and usage of the lock in a pool that extends across all nodes in the distributed computing environment,
wherein the lock move is not moved when the synchronization object is being used to protect the resource,
wherein the node on which the access rate of the synchronization object is greatest is determined by an analysis of profiling results, and
wherein the node on which the access rate of the synchronization object is greatest is determined by a speculative code analysis or execution.

12. The system of claim 11, wherein the first condition comprises a beginning of a run and a second condition comprises an entry of a routine.

13. The system of claim 12, wherein the routine is resident on the second node and the relocating of the synchronization object from the first node to the second node is performed in response to entering the routine.

14. The system of claim 11, wherein the relocating the synchronization object from the storage on the first node to the storage on the second node comprises invalidating an instance of the synchronization object on the first node and validating a pre-existing instance of the synchronization object on the second node.

15. The system of claim 11, embodied in a cloud-computing environment.

* * * * *